UNITED STATES PATENT OFFICE.

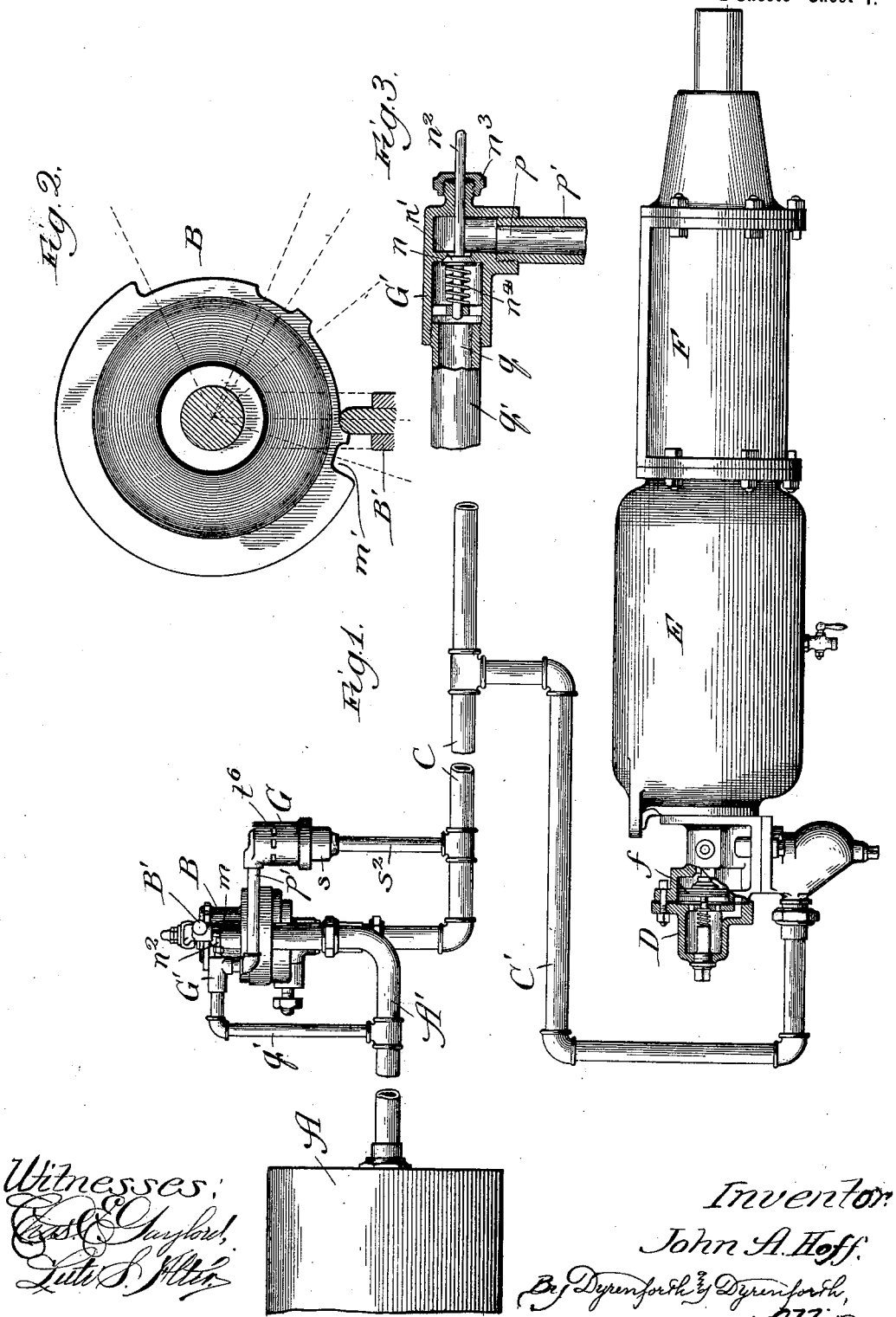

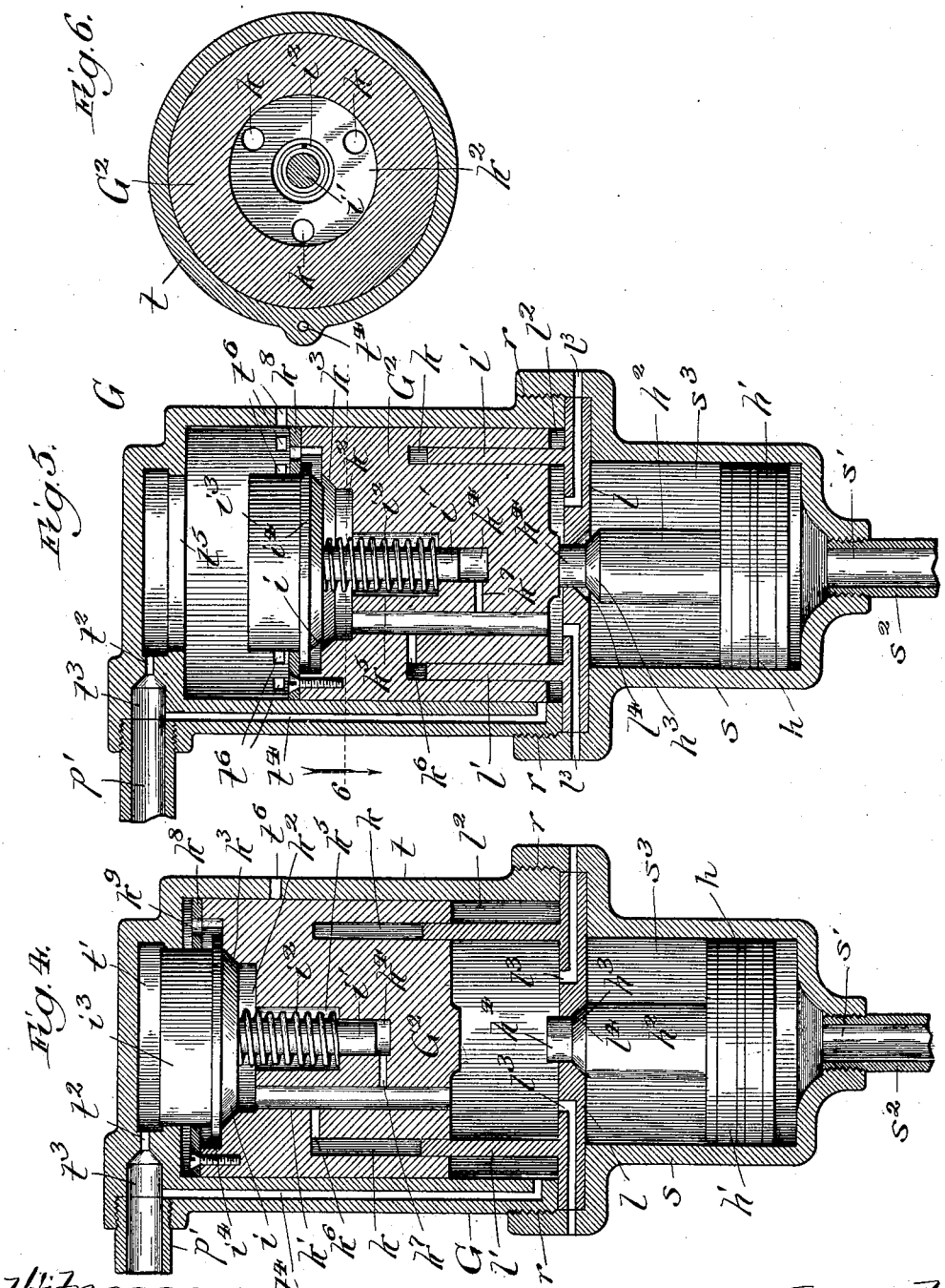

JOHN A. HOFF, OF CHICAGO, ILLINOIS, ASSIGNOR TO WILLIAM T. BLAINE, OF SAME PLACE.

FLUID-PRESSURE OPERATING DEVICE.

SPECIFICATION forming part of Letters Patent No. 633,344, dated September 19, 1899.

Application filed April 15, 1898. Serial No. 677,757. (No model.)

*To all whom it may concern:*

Be it known that I, JOHN A. HOFF, a citizen of the United States, residing at Chicago, in the county of Cook and State of Illinois, have invented a new and useful Improvement in Fluid-Pressure Operating Devices, of which the following is a specification.

My invention relates to means for producing vibrations in a confined body of fluid or fluid-pressure medium for the purpose of exerting force through the medium against a movable abutment and actuating the same.

The use for which my invention in the present instance is more particularly intended is in connection with air-brake apparatus for railway-trains to produce a sudden and more or less violent vibration or series of vibrations of the train-pipe air when, for example, the ordinary air supplying or exhausting means would fail in or be less suitable for accomplishing the purpose intended.

In the present connection I have shown my invention applied to an air-brake apparatus for the purpose of facilitating the operation of brakes in the sense of releasing them in the event that the triple-valve pistons stick against the force of pressure admitted to the train-pipe from the main reservoir to release the brakes.

In air-brake apparatus it frequently happens that owing to wear of the packing-ring of the main piston of a triple valve air is permitted to leak past the piston. When the piston has been moved forward under the force of auxiliary-reservoir pressure to apply brakes and it is desired to release brakes, the pressure is raised in the train-pipe to overbalance that of the auxiliary reservoirs against the pistons, and thus move the latter, with the slide-valves, to release position. Although it is usual to provide an excess of pressure in the main reservoir sufficient to raise the train-pipe quickly to brake-releasing pressure, the rise of pressure, especially in a long train, is necessarily gradual, so that in the event that air can leak past a piston of a triple valve while in its forward position the air instead of moving the piston will pass to the auxiliary reservoir at the valve, and thus leave the brakes controlled by said valves applied. This difficulty is called "sticking" of the brakes, and hitherto the remedy has been by local bleeding performed by opening a cock at the auxiliary reservoir to relieve the pressure therein rapidly and permit the train-pipe pressure to act with sufficient preponderance of force against the piston to move it to release position. Thus in order to accomplish the release of brakes when stuck it has been necessary for a train-hand to examine the brakes of the cars to find out where the difficulty lay and then bleed the respective reservoir or reservoirs, all of which has usually caused delays in starting, which at times have been attended with danger and have even been the cause of collisions between trains.

My object is primarily to provide means for actuating mechanism at or toward one end of a confined body of fluid through the medium of said fluid by producing more or less violent vibrations in the fluid medium generated by physical impact at or toward the other end of said medium.

It is further my object broadly to apply my invention to an air-brake apparatus for transmitting impulses through the train-pipe to actuate triple valves without change in the pressure of the train-pipe air; and it is still further my object to apply the invention to an air-brake apparatus for producing vibrations in the train-pipe air, which by striking against the triple-valve pistons will jar them with sufficient force to drive to release position any that may stick against the rise of pressure from the main reservoir.

The theory on which my invention is founded is that a blow struck against a body of air, particularly when confined and under pressure, will produce a jarring impulse, which may travel throughout the body, and while such a blow or succession of blows may be produced by the sudden release from pressure of an expanding fluid, the ignition of an explosive material, or the impact of a denser or solid body I prefer for convenience of construction and operation to adopt the latter expedient.

In carrying out my invention for releasing brakes I provide a mechanical impact device under the control of the engineer, which will strike a single blow or blows in rapid succession against the body of air in the train-pipe and produce impulses or vibrations which will jar and move any piston that may stick to release position.

In the drawings, Figure 1 is a broken and partly-sectional view in the nature of a diagram, showing parts of an automatic air-brake system with my improvement applied thereto; Fig. 2, an enlarged broken sectional plan view of an engineer's brake-valve; Fig. 3, an enlarged broken section of a valve at the engineer's valve for admitting air to the pneumatic hammer device which I prefer to employ in carrying out my invention; Figs. 4 and 5, enlarged broken vertical sections of the pneumatic hammer device, showing the moving parts in different positions; and Fig. 6, a plan section taken on line 6 of Fig. 5.

A is the main reservoir of an air-brake apparatus; B, an engineer's brake-valve communicating through the pipe A' with the main reservoir; C, a train-pipe; D, a triple valve; C', a branch pipe extending from the train-pipe to the triple valve; E, an auxiliary reservoir, and F a brake-cylinder. The parts described are illustrated in the form now in general use in this country.

G is a device containing impact mechanism in the form of a pneumatic hammer and having a casing formed, preferably, of two cylindrical shell members $t$ $s$, screwed together at $r$, as illustrated. The shell member $s$ is in open communication through a port $s'$ and pipe $s^2$ with the train-pipe C.

On the engineer's brake-valve B is a valve-shell G', having an inlet-port $q$ in open communication through a pipe $q'$ with the main-reservoir pipe A' and an outlet-port $p$ in open communication through a pipe $p'$ with the interior of the device G at the top of the shell member $t$. Between the ports $q$ and $p$ in the valve-shell G' is a valve-seat $n$, against which fits a valve $n'$ upon a stem $n^2$, which passes through a stuffing-box $n^3$ in the end of the shell. On the stem is a confined spring $n^4$, which tends normally to seat the valve $n'$ in the direction of the port $p$. In Figs. 1 and 2 the handle B' of the engineer's brake-valve is shown at release position. On the under side of the said handle I provide a lug or projection $m$, which when at release position contacts with, without moving, the valve-stem $n^2$. Beyond the release-notch, on the shell of the valve B, I provide an additional notch $m'$, to which the handle B' may be moved to press the stem $n^2$ in the direction of opening the valve $n$ against the resistance of the spring $n^4$ and the pressure from the main reservoir.

Confined between the shell members $s$ $t$ in the device G, as I prefer to construct it, is a stationary diaphragm $l$, provided in the shell member $t$, with a cylindrical projection or wall $l'$ concentric with the inner wall of the shell and close thereto to leave a narrow annular space $l^2$. In the shell member $t$ is a piston or plunger $G^2$, provided in its under face with a deep annular recess $k$, which fits over the wall or projection $l'$. Extending through the piston $G^2$ is a passage $k'$, terminating at its top in a recess $k^2$ in the upper side of the piston, forming a valve-seat $k^3$. Fitting the valve-seat $k^3$ is a valve $i$ on a stem $i'$, working at its lower end in a guide-socket $k^4$ in the piston and surrounded by a confined spring $i^2$ in a socket $k^5$ in the piston. The passage $k'$ communicates through a branch passage $k^6$ with the top of the annular recess $k$ and through a branch passage $k^7$ with the lower end of the socket $k^4$. In the upper end of the chamber $t'$, formed by the shell member $t$, is a small inlet-port $t^2$, which communicates with a port $t^3$, to which the pipe $p'$ leads, and extending from the said port $t^3$ to the lower end of the annular space $l^2$ is a passage $t^4$, which may be cored in the wall of the shell, as shown. The upper portion of the chamber $t'$ is reduced to form a short cylinder $t^5$ just below the port $t^2$, and on the valve $i$ is a cylindrical projection $i^3$, which enters the cylinder-opening $t^5$, as hereinafter described. Surrounding the cylindrical extension $i^3$ of the valve $i$ is a flange $i^4$, and at the top of the piston $G^2$ is a ring $k^8$ in the path of the flange $i^4$ to limit the rise of the valve $i$ from its seat. Extending through the ring $k^8$ is an opening $k^9$. Around the shell member $t$ is an annular series of exhaust-openings $t^6$ in a plane just above the top of the piston $G^2$ when the latter descends to its lowest position, as shown in Fig. 5. In the rise of the piston from that position it closes the ports $t^6$. The lower end of the chamber $t'$ in the cylinder formed by the annular wall $l'$ is in open communication with the outside air through ports $l^3$, which may be cored through the diaphragm $l$ and shell member $s$, as shown. In the center of the diaphragm $l$ is an opening flared at its under side to produce a valve-seat $l^4$. In the chamber or cylinder $s^3$, formed by the shell member $s$, is a piston or movable abutment $h$, which may be provided with packing-rings $h'$, as shown, to fit the wall of the cylinder. The piston $h$ is on a stem $h^2$, having the tapered face portion $h^3$, forming a valve to fit the valve-seat $l^4$, and the reduced end portion $h^4$, which fits and moves in the guide-opening through the diaphragm $l$.

The operation of the pneumatic hammer device G is as follows: When the parts are in the position shown in Fig. 4, the upper surface of the valve extension $i^3$ is exposed to pressure, which may be caused to enter at the port $t^2$, and that part of the lower end of the piston or plunger $G^2$ which is in the annular space $l^2$ is also exposed to said pressure entering through the passage $t^4$. The area of the top of the valve extension $i^3$ is somewhat in excess of that of the annular strip of the piston working in the space $l^2$. The pressure entering through the port $t^2$, exerting itself against the upper end of the extension $i^3$, presses the latter downward with the valve $i$ against the resistance of the spring $i^2$ to seat the valve, following which the piston is moved downward. The increase of area presented to the air entering through $t^2$ when the extension $i^3$ passes out of the opening $t^5$ causes the piston and attendant parts to be driven downward with increased force until the lower end of the piston or plunger strikes the part $h^4$ of the stem of the piston $h$. The piston $h$ is normally in the raised position shown in Fig. 4, owing to the pressure against it from the train-pipe through the port $s'$, and the impact produced by the upper piston or hammer striking against the stem of the lower piston causes the latter to deal a blow to the body of compressed air in the train-pipe, and thus generate an impulse which travels through the pipe. As the piston or plunger $G^2$ nears the limit of its stroke in the downward direction it opens the ports $t^6$, which are of so much greater area than the small inlet-port $t^2$ that the pressure above the piston vents practically instantaneously. This permits the pressure in the annular space $l^2$ beneath the piston to act and raise the piston or plunger to the position shown in Fig. 4. When the pressure is vented from above the said piston, as before stated, the spring $i^2$ acts to raise the valve $i$ from its seat and open a passage through $k^9$ $k^2$ $k'$ to the under side of the piston within the cylinder $l'$, which, as before stated, is open to the atmosphere through the passages $l^3$. Immediately that the valve-extension $i^3$ enters the opening $t^5$ it is subjected to the pressure through the port $t^2$ and moved downward, first to close the valve $i$ and then to force the piston downward for another blow upon the piston $h$, as before described. The branch passages $k^6$ $k^7$ keep the sockets $k^4$ $k$ open to the atmosphere, so that there can be no accumulation of pressure therein to retard the action.

In the triple valve D (shown in Fig. 1) the main piston $f$ is in its forward or brake-applying position. When the handle $B'$ of the engineer's valve is moved to release position, the pressure from the main reservoir passing into the train-pipe C and branch pipe $C'$ will exert itself against the piston $f$ to overcome the resistance of the auxiliary-reservoir pressure and move the piston backward (to the right) to release position. This will take place unless, owing to leakage of air past the piston $f$ or from other cause, the pressure rises too slowly in the train-pipe to start the piston. In the event that the piston sticks the engineer will move the handle $B'$ beyond release position to the notch $m'$, thereby opening the valve device $G'$ and admitting air through the pipe $p'$ to the pneumatic hammer device. This operates, as before described, to reciprocate the piston or hammer $G^2$ very rapidly to strike blows in rapid succession against the piston $h$ and through the latter against the body of air in the train-pipe. The jarring effect against the piston $f$ produced by these impulses in the train-pipe will start the piston and move it to release position.

Of course if all the triple valves on the cars of the train are in perfect working order, so that there will be no material leakage past the main pistons thereof, and they do not stick from that or any other cause there will be no reason for bringing my improved brake-releasing means into operation, while should one or more triple valves on the train be out of order and cause the brakes on one or more cars to stick the engineer will detect it immediately in starting the train and bring my improved releasing means into action to produce immediate release of the brakes that stick, as before described.

My invention as applied to a brake apparatus for releasing brakes lies, broadly stated, in means for creating one or a succession of impulses in the train-pipe to act against or jar, and thus actuate or start, the piston of any triple valve that may stick, and while I prefer to produce the impulses by means of a pneumatic hammer, as described, interposed in the train-pipe at a desired point between the main reservoir and the triple valves of the train my invention is not to be limited to the use of such an impacting device.

While I prefer in employing a pneumatic hammer to provide it of the construction illustrated and described, I do not limit the invention to the specific construction, as it may be varied in the matter of details without departing from the spirit of the invention as defined by the claims.

What I claim as new, and desire to secure by Letters Patent, is—

1. In an air-brake apparatus, the combination with the train-pipe and a triple-valve piston, of means for actuating the piston comprising impact mechanism interposed in the train-pipe to operate upon the air therein and produce piston-actuating impulses, substantially as described.

2. In an air-brake apparatus, the combination with the train-pipe, of brake-releasing means comprising impact mechanism interposed in the train-pipe to operate against the body of air therein and produce impulses, substantially as and for the purpose set forth.

3. In an air-brake apparatus, the combination with the train-pipe, of brake-releasing means comprising impact mechanism interposed in the train-pipe adjacent to the engineer's brake-valve to operate against the body of air therein and produce impulses, substantially as and for the purpose set forth.

4. In an air-brake apparatus, the combination with the train-pipe, of brake-releasing means comprising impact mechanism interposed in the train-pipe adjacent to the engineer's brake-valve and actuated by movement of the brake-valve handle, to operate against the body of air in the train-pipe, and produce impulses therein, substantially as and for the purpose set forth.

5. In an air-brake apparatus, the combination with the train-pipe, of brake-releasing means comprising a shell communicating with the train-pipe, a movable abutment in the shell, and means for impinging the abutment against the body of air in the train-pipe, to produce impulses therein, substantially as and for the purpose set forth.

6. In an air-brake apparatus, the combination with the train-pipe, of brake-releasing means comprising a fluid-pressure hammer device interposed in the train-pipe to operate against the body of air therein and produce impulses, substantially as and for the purpose set forth.

7. In an air-brake apparatus, the combination with the train-pipe, of brake-releasing means comprising a pneumatic hammer device interposed in the train-pipe and actuated by air from the main reservoir to operate against the body of air in the train-pipe and produce impulses therein, substantially as and for the purpose set forth.

8. In an air-brake apparatus, the combination with the train-pipe and engineer's brake-valve, of a fluid-pressure hammer device interposed in the train-pipe, and actuated by movement of the engineer's brake-valve handle to produce brake-releasing impulses in the train-pipe, substantially as and for the purpose set forth.

9. In an air-brake apparatus, the combination with the train-pipe, of brake-releasing means comprising a movable abutment exposed at one side to the body of air in the train-pipe, and impact mechanism operating against said abutment to produce impulses in the said body, substantially as and for the purpose set forth.

10. In an air-brake apparatus, the combination with the train-pipe, of brake-releasing means comprising a movable abutment exposed at one side to the body of air in the train-pipe, and a fluid-pressure hammer operating against said abutment to produce impulses in the said body, substantially as and for the purpose set forth.

11. In an air-brake apparatus, the combination with the train-pipe, of brake-releasing means comprising a movable abutment exposed at one side to the body of air in the train-pipe, and a pneumatic hammer actuated by air from the main reservoir to operate against said abutment and produce impulses in the said body, substantially as and for the purpose set forth.

12. In an air-brake apparatus, the combination with the train-pipe, of brake-releasing means comprising a movable abutment exposed at one side to the body of air in the train-pipe, and a pneumatic hammer actuated by air from the main reservoir brought about by movement of the handle of the engineer's brake-valve to operate against said abutment and produce impulses in the said body, substantially as and for the purpose set forth.

JOHN A. HOFF.

In presence of—
  R. T. SPENCER,
  DAN. W. LEE.